United States Patent [19]

Caveney

[11] 3,971,105
[45] July 27, 1976

[54] MOUNT FOR FLAT OBJECTS SUCH AS FLAT CABLES

[75] Inventor: Jack E. Caveney, Hinsdale, Ill.

[73] Assignee: Panduit Corporation, Tinley Park, Ill.

[22] Filed: Jan. 8, 1975

[21] Appl. No.: 539,373

[52] U.S. Cl. .............................. 24/16 PB; 248/74 PB
[51] Int. Cl.² .......................................... B65D 63/00
[58] Field of Search ............... 24/5, 30.5 P, 30.5 R, 24/73 PB, 16 R, 16 PB, 153 S; 248/74 PB

[56] References Cited
UNITED STATES PATENTS

| 1,771,317 | 7/1930 | Ross | 24/16 R |
| 2,465,820 | 3/1949 | Sharrow et al. | 24/16 R X |
| 2,809,065 | 10/1957 | Erke | 24/30.5 P UX |
| 3,210,032 | 10/1965 | Van Slyke | 24/73 PB UX |
| 3,454,247 | 7/1969 | Geisinger | 248/74 PB X |
| 3,454,249 | 7/1969 | Geisinger | 248/74 PB X |
| 3,542,321 | 11/1970 | Kahabka | 24/16 PB X |
| 3,672,615 | 6/1972 | Fiorentino | 24/73 PB X |

OTHER PUBLICATIONS
Technical Digest No. 26, pp. 33-34, Apr., 1972, Western Electric Giertz

*Primary Examiner*—Donald A. Griffin
*Attorney, Agent, or Firm*—Charles R. Wentzel; Richard B. Wakely

[57] ABSTRACT

A mount for use with a cable tie having a locking head and a strap extending therefrom for holding at least one elongate object having opposed generally flat first and second sides, such as a flat cable. The mount includes a first member which either has a substantially flat surface for engaging the first side of the object or has means for providing such a surface and further has guide means for guiding the strap about a portion of the first member so that the strap extends beyond the substantially flat surface. The mount also includes a second member which has holding means for captively holding the locking head. The second member either has a substantially flat surface for engagement with the second side of the object or has means for providing such a surface and further has guide means for guiding the cable tie about a portion of the second member so that the cable tie extends beyond the last-mentioned substantially flat surface. The substantially flat surfaces are positionable facing each other and in substantial registration. After the locking head is positioned in the holding means and the strap is positioned in the respective guide means of the first and second member, respectively, the object can be inserted between the flat surfaces and the strap inserted through the locking head and tightened thereby to firmly hold the object without substantial deformation thereof.

21 Claims, 10 Drawing Figures

3,971,105

MOUNT FOR FLAT OBJECTS SUCH AS FLAT CABLES

BACKGROUND OF THE INVENTION

This invention concerns mounts for cables and more particularly a mount for holding one or more flat cables without substantial deformation thereof.

Flat flexible cables and ribbon cables have come into growing use where a plurality of points in one area are to be connected to a corresponding plurality of points in a second area without runout of the conductors between these two areas, for example, in electronic computers. These flat cables comprise a plurality of individual insulated conductors running side by side. Flat cables having a plurality of air passageways running side by side are also in use in pneumatic logic circuits. Such cables, either electrical or pneumatic, are relatively delicate compared to circular cables and deformation or pinching of one or more conductors or air passageways of the flat cable can easily occur particularly at the edges of the cable. Heretofore, flat cables have typically been mounted on a support such as a panelboard by using a metal plate having a resilient insulator for engaging the flat cable. The plate is generally screwed down to the support with the cable positioned between the insulator and the support. In many cases the cover plate is overly tightened so that it deforms and distorts one or more conductors in the flat cable. Also, if the insulator is not properly positioned, the metal plate can contact the cable and cut it upon tightening of the plate.

Other means for mounting the cables have been proposed. These have included a U-shaped mount having adhesive at the ends of the arms for permanently mounting a flat cable to the support. However, once this mount is in place, it cannot be easily removed without damage to the conductors or without destroying the mount. Also, because this mount is not adjustable, the flat cable is usually held either too tightly or too loosely.

A resilient U-clamp has been proposed the arms of which hold the opposed wide surfaces of flat cables therebetween. It has adhesive backing on the outside surface of one arm for securing the clamp to a support. This clamp "bites" the cable rather than applying uniform force across the surface of the cable. Also, the tension applied by the clamp varies with the number of layers of flat cable held.

An adjustable flat clamp has been proposed for use with a cable tie for bundling individual insulated conductors. The clamp includes interlocking longitudinally slidable identical members. This clamp appears unsuited for use with a flat cable because tightening of the cable tie causes the clamp to slide to its retracted position which in turn causes deformation and distortion particularly at the edges of the flat cable.

SUMMARY OF THE INVENTION

Among the several objects of the present invention may be noted the provision of an improved insulative mount for use with a cable tie for forming a plurality of flat cables into a bundle of generally rectangular cross section and for mounting one or more flat cables to a support; the provision of such a mount which avoids pinching of the cable conductors and avoids excessive deformation of the cable; the provision of such a mount which allows generally uniform tightening of the cable tie around the cable or cables; the provision of such a mount which captively holds and positions the head of the tie and guides the strap of the tie; the provision of such a mount which is reusable; and the provision of such a mount which is convenient in use as the mount has a low profile and the cable tie holds the components of the mount together when the flat cables are inserted in the mount, which is light in weight, and which is simple and economical to manufacture. Other objects and features will be in part apparent and in part pointed out hereinafter.

Briefly, a mount of the present invention includes a first member and a second member for use with a cable tie having a locking head and a strap extending therefrom for forming a plurality of elongate objects having opposed generally flat first and second sides into a bundle or for mounting one or more of the objects on a support. The first member has a substantially flat surface for engaging a first side of one object and the second member similarly has a substantially flat surface for engaging the second side of the object or the second side of another object, depending on whether one or more objects are to be held. The first member has guide means for guiding the strap about a portion of the first member so that the strap extends beyond the substantially flat surface. The second member has holding means for captively holding the locking head and further has guide means for guiding the cable tie about a portion of the second member so that the cable tie extends beyond the second member's substantially flat surface. The flat surfaces are positionable facing each other and in substantial registration for holding the objects therebetween.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
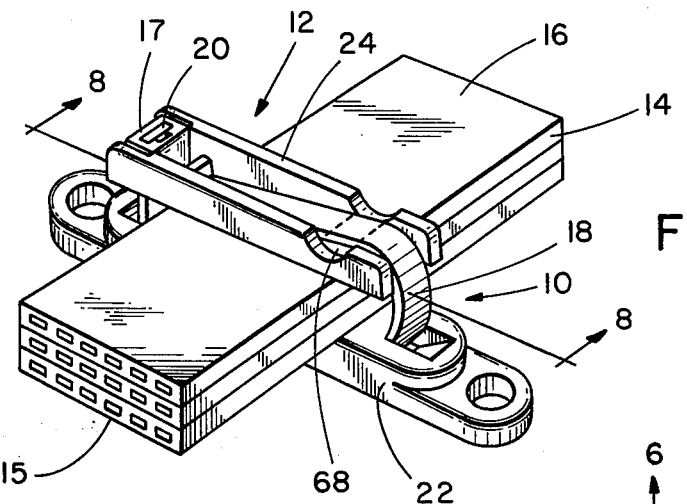
FIG. 1 is a perspective view of a mount of the present invention used in conjunction with a cable tie.

Referring now to the drawings, a mount for use with a cable tie 10 is generally shown at reference numeral 12. The mount 12 and the cable tie are for use in forming a plurality of elongate generally flat objects 14 such as flat cables or ribbon cables into a bundle having a generally rectangular cross section and for mounting at least one such object onto a support such as a panelboard (not shown). Each object 14 has opposed generally flat first and second sides or wide surfaces 15, 16.

Generally flat is used in its broad sense and is intended to include the generally rippled opposed sides found in certain types of flat cables and ribbon cables. Cable tie 10 includes a locking head 17 and a strap 18 extending therefrom. The head includes a transverse aperture 20 for receiving the strap and has locking means for engaging the strap after it has been inserted in the aperture. Such a cable tie is shown in commonly assigned U.S. Pat. No. 3,660,869.

Figure 2:
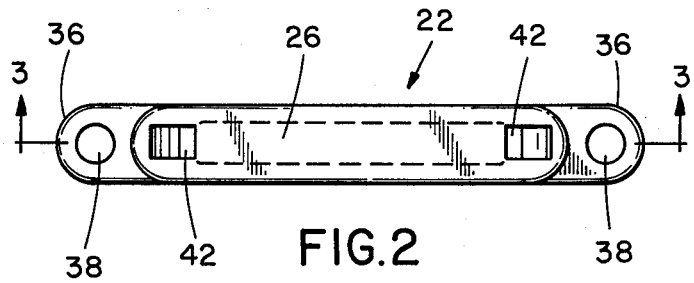
FIG. 2 is a plan of a base of the mount.
Figure 3:
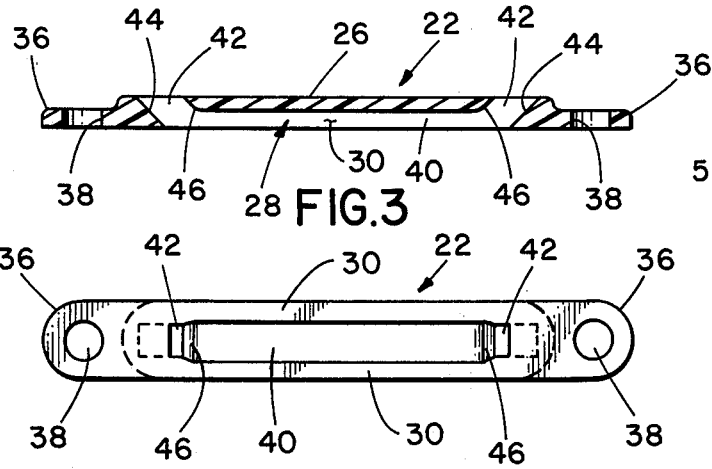
FIG. 3 is a sectional view taken generally on line 3—3 of FIG. 2.
Figure 4:
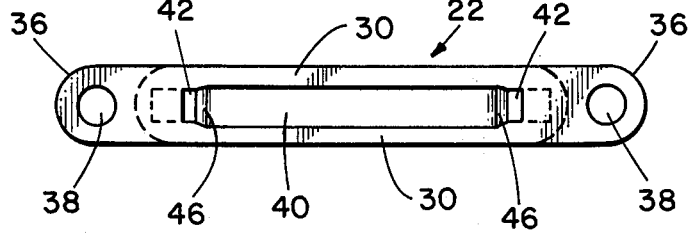
FIG. 4 is a bottom view of the base of FIG. 2.

The mount is preferably constructed of an insulative material such as nylon and includes an elongate first member or mounting base 22 and an elongate second member or clamp cover 24. As best shown in FIGS. 2–4, mounting base 22 has a substantially flat surface 26 for engaging a first side 15 of one of the objects and further includes guide means 28 for guiding the strap about a portion of the base so that the strap extends beyond surface 26. Of course, the word "beyond" is to be accorded its broad meaning and as used above simply indicates that the strap extends further in the longitudinal direction of the base than does substantially flat surface 26. The clamp cover 24 (see FIGS. 5–7) has holding means for captively holding locking head 17 and further includes a substantially flat surface 32 for engaging a second side 16 of one of the objects. Cover 24 also includes guide means for guiding the cable tie about a portion of cover 24 so that the cable tie extends beyond surface 32. As will appear hereinafter, when the objects are held by mount 12, they are disposed between flat surfaces 26, 32 which are positionable in substantial registration. Flat surfaces 26, 32 are at least slightly wider than object sides 15, 16 to allow cable tie 10 to be positioned around the objects without engaging the object sides.

More particularly, as shown in FIGS. 2–4, base 22 includes a pair of tongues 36 extending oppositely in the longitudinal direction of the base with each tongue 36 having an aperture 38 for receiving a fastener (not shown) for mounting the base on a panelboard or the like. Guide means 28 comprises a pair of spaced walls 30 which partially define an elongate slot 40 extending generally parallel to surface 26 and spaced therefrom, and base 22 further includes apertures 42 extending from adjacent each end of surface 26 and into slot 40. Surface 26 is raised relative to tongues 36 to permit slot 40 to be of sufficient depth to permit convenient threading of strap 18 when base 22 is mounted on a flat surface, one of the apertures 42 permitting entrance of strap 18 into slot 40, the other aperture 42 permitting egress of the strap therefrom. Each aperture 42 is partially defined by transversely extending opposed surfaces 44, 46 (see FIG. 3). Surfaces 44, 46 extend inwardly from substantially flat surface 26 thereby serving to guide strap 18 into and out of slot 40. The portion of surfaces 46 adjacent slot 40 are curved to eliminate excessive stress concentration in the strap caused by sharp bends and which could occur as the cable tie 10 is tightened. Additionally, the curvature of these portions permits strap motion relative thereto during tensioning of the strap.

Figure 5:
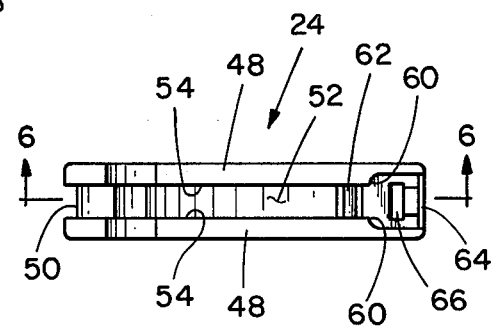
FIG. 5 is a plan of a clamp cover of the mount.
Figure 6:
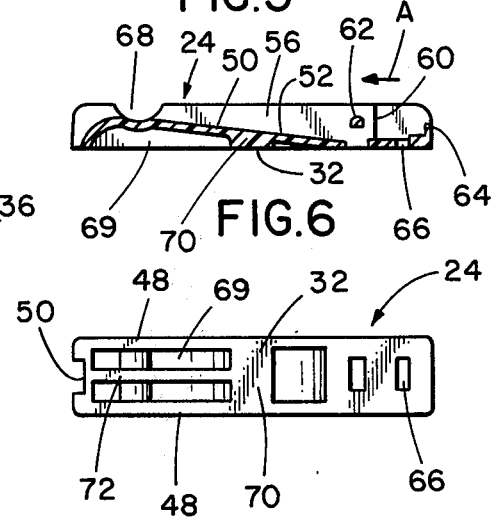
FIG. 6 is a sectional view taken generally on line 6—6 of FIG. 5.
Figure 7:
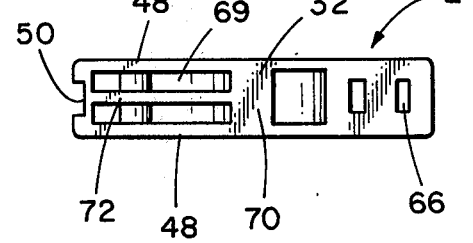
FIG. 7 is a bottom view of the clamp cover of FIG. 5.

Referring to FIGS. 5–7, clamp cover 24 is generally channel shaped and includes a pair of spaced, generally parallel side rails or arms 48 extending from substantially flat surface 32 and a support or web 50 joining the rails. Flat surface 32 comprises one side or a base surface or support 50 which has an opposite surface 52 joining facing side surfaces 54 of rails 48. Surfaces 52, 54 define a channel 56 and constitute the guide means of the clamp cover for receiving and guiding strap 18.

Figure 8:
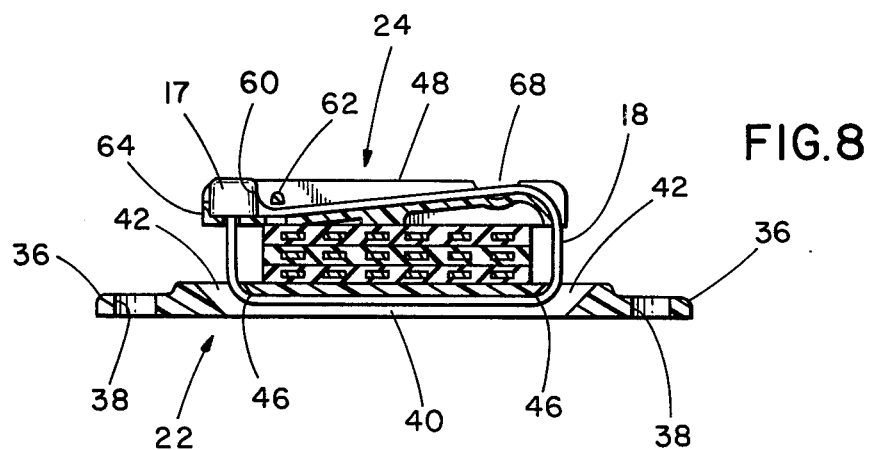
FIG. 8 is a sectional view taken generally on line 8—8 of FIG. 1.

Rails 48 are relieved adjacent one end of cover 24 to form transversely extending abutment surfaces 60 for engaging locking head 17 with strap 18 projecting into channel 56 as shown in FIGS. 1 and 8. The holding means comprises these abutment surfaces and also includes a retainer 62 bridging rails 48 for holding cable tie 10. As shown in FIGS. 6 and 8, retainer 62 is sufficiently spaced from surface 52 for passage of strap 18 therebetween. The holding means further comprises a lip 64 extending from surface 52 at one end of cover 24 and spaced from abutment surfaces 60 a distance slightly greater than the length of locking head 16. It will be appreciated that as strap 18 is pulled through channel 56 in the direction shown by the arrow A in FIG. 6, the locking head 17 will be resiliently deflected upwardly relative to strap portion 18 which is held adjacent joining surface 52 by retainer 62. When locking head 17 passes lip 64, it will snap into engagement with the joining surface, and shortly thereafter it will engage abutment surfaces 60. Thus, the locking head is firmly held between lip 64 and abutment surfaces 60 with strap 18 held between joining surface 52 and retainer 62. Cover 24 also has an aperture 66 therethrough adjacent lip 64 which is aligned with locking head aperture 20 when the locking head is held as described above. Aperture 66 permits threading of the strap into the locking head.

Joining surface 52 is inclined from one end of cover 24 relative to substantially flat surface 32 and the portion of joining surface 52 adjacent the other end of the cover is curved toward surface 32 to provide a large radius turn for strap 18 thereby to eliminate excessive stress concentration in the strap as it is tightened about the objects. It should be appreciated that this large radius turn along with the curved portions of surfaces 46 adjacent slot 40 in the base 22 permit strap motion about mount 12 during tightening of the strap thus distributing tension generally uniformly about the mount and thereby preventing loss of tension, as would occur if the strap was tensioned around sharp corners, and tipping of the clamp cover 24 relative to base 22. As shown in FIGS. 1, 6 and 8, cover 24 also includes a transverse slot 68 extending through rails 48 and adjoining an indentation or dip in joining surface 52 for receiving a cutter (not shown) to allow cutting of cable tie 10. It will be appreciated the indentation allows the cutter to extend below the pass line of the strap.

As shown in FIG. 7, support 50 includes a slot 69 extending from substantially flat surface 32 and having an inclination following that of joining surface 52 for reducing the material and weight of clamp cover 24. The support includes transverse and longitudinal reinforcing ribs 70, 72, respectively, for providing adequate torsional and beam strength.

Operation of mount 12 is as follows: After mounting base 22 is affixed to a support such as a panelboard, strap 18 of a cable tie 10 is threaded between joining surface 52 and retainer 62 until locking head 17 snaps resiliently into the holding means. Strap 18 is next threaded through slot 40 of mounting base 22 via apertures 42. It should be noted that the base holds the cable tie and the cable tie holds the clamp cover to keep the various pieces together and to allow the user to conveniently insert object(s) 14 between the clamp cover and base so that respective substantially flat surfaces 26, 32 of the mount can engage respective wide surfaces 15, 16 of the objects(s). The free end of strap 18 is then threaded through locking head 17 via aperture 66. Since flat surfaces 26, 32 are at least slightly wider than object sides 15, 16, the object(s) can be positioned so that the surfaces 15, 16 of the object(s) are not engaged by the strap. Also, substantially flat surfaces 26, 32 can be positioned in substantial registration.

The cable tie is finally tightened until the objects are firmly held by mount 12, this being achieved without pinching, squeezing or substantially deforming the conductors of the flat cable since the flat surfaces of the mount engage the flat sides of the objects. This last step can conveniently be effected by hand tightening or by use of a tightening tool which automatically cuts off the end of the strap after a predetermined tension is achieved. Such a tool is fully described in commonly assigned U.S. Pat. No. Re. 26,492. Thus, the mount permits selective tensioning of the cable tie, which usually causes the held conductors to form a bundle of generally circular cross section, while maintaining the cables 14 flat and parallel.

The mount is reusable in that cable tie 10 can be conveniently cut and the same mount used with another cable tie or the same cable tie if it is of the releasable type. It should also be appreciated that the mount has a generally low profile and this permits its use where space is limited such as in an equipment enclosure having a high density of electronic components and that the mount maintains the conductors of a flat cable from crossing to prevent cross talk. Of course, the maintenance of the conductors in their desired parallel relationship provides simplified calculation of inductance and capacitance between and among the conductors.

Figure 9:
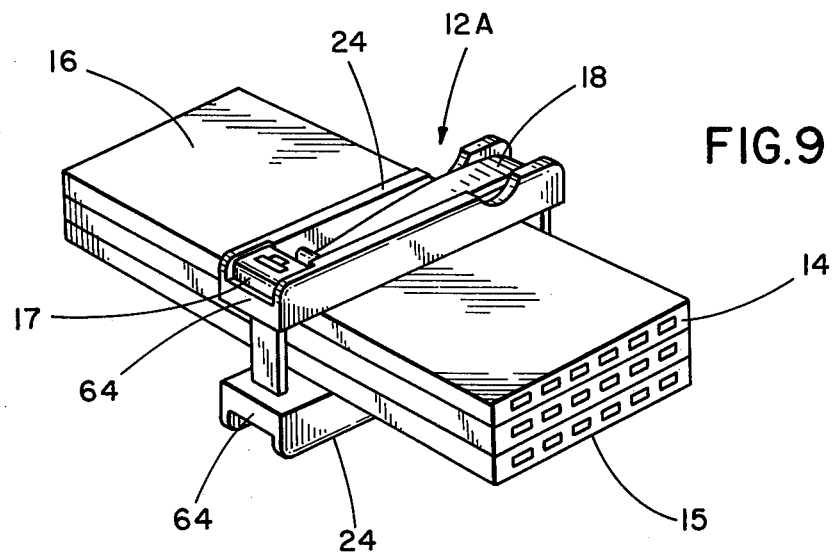
FIG. 9 is a perspective view of an alternate embodiment of the mount of the present invention used in conjunction with a cable tie.

As shown in FIG. 9, two clamp covers 24 can be conveniently used to form a mount 12A where it is desired to form a plurality of flat cables into a bundle without securement of the bundle to a support. In this case, one of the clamp covers becomes the first member of the mount. The operation of mount 12A is similar to that heretofore described. The use of mount 12A vis-a-vis mount 12 provides certain economies in that a cover 24 has less material than a base 22. Also mount 12A is substantially shorter than mount 12 thereby being more manipulatable in tight confines.

Figure 10:
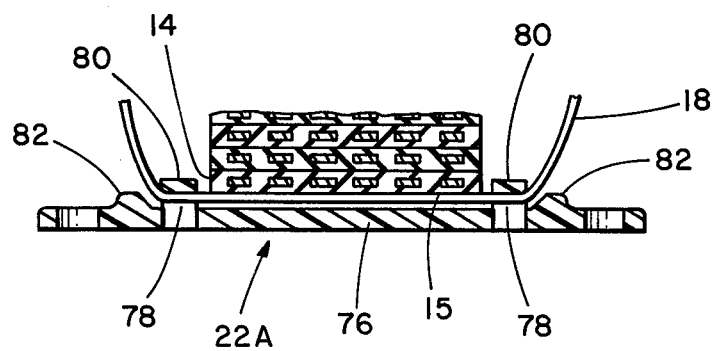
FIG. 10 is a cross-sectional view of an alternate embodiment of the base of the present invention used in conjunction with a cable tie.

Referring now to FIG. 10, an alternate embodiment of the base of the present invention is shown at reference numeral 22A. Base 22A comprises means for providing a substantially flat surface for engaging side 15 of flat cable 14 and further includes guide means for guiding strap 18 about a portion of base 22A so that the strap extends beyond the substantially flat surface. More particularly, base 22A includes an elongate support 76 having a pair of spaced arms 78 extending generally perpendicularly from the support adjacent each end thereof with the spacing between each respective pair of spaced arms 78 at least as great as the width of strap 18. The distal ends of each respective pair of spaced arms 78 are joined by a bridge 80 with the spacing between each bridge 80 and support 76 somewhat greater than the thickness of strap 18. Support 76 also has a protuberance 82 extending adjacent each respective pair of spaced arms 78 with each protuberance 82 sufficiently spaced from the respective adjacent bridge 80 for passage of strap 18 between support 76 and the bridge 80.

The guide means of base 22A comprise arms 78 and protuberances 82 while the means for providing a substantially flat surface includes bridges 80. It will be understood that base 22A can be used in conjunction with clamp cover 24 and after tensioning of the cable tie, the portion of strap 18 extending between bridges 80 will be substantially flat and a surface of that strap portion will be the substantially flat surface engaging side 15 of flat cable 14.

It will further be understood that an alternate embodiment of the clamp cover of the present invention can easily be provided which includes the means for providing a substantially flat surface of base 22A and the holding means of clamp cover 24. The operation of a mount including these alternate embodiments of the base and clamp cover is similar to that of mount 12.

As various changes could be made in the above construction without departing from the scope of the invention, it is intended that all matter contained in the above description shall be interpreted as illustrative and not in a limiting sense.

What is claimed is:

1. A mount for use with a cable tie having a locking head and a strap extending therefrom for holding at least one flat cable having opposed generally flat first and second sides, said mount comprising:
    a first member comprising means for providing a substantially flat surface for engaging the first side of said flat cable and further having guide means for guiding said strap about a portion of said first member so that said strap extends beyond said substantially flat surface; and
    a second member having holding means for captively holding the locking head and having means for providing a substantially flat surface for engaging the second side of said flat cable and further having guide means for guiding said cable tie about a portion of said second member so that said cable tie extends beyond the last-mentioned substantially flat surface, said substantially flat surfaces being positionable facing each other and in substantial registration with each other whereby after the locking head is positioned in the holding means and the strap is positioned in the respective guide means of the first member and the second member, respectively, the flat cable can be inserted between said flat surfaces and the strap inserted through the locking head and tightened thereby to firmly hold said flat cable without substantial deformation thereof.

2. A mount as set forth in claim 1 wherein said cable tie comprises one of said substantially flat surfaces.

3. A mount for use with a cable tie having a locking head and a strap extending therefrom for holding at least one elongate object having opposed generally flat first and second sides, such as a flat cable, said head including a strap-receiving aperture extending therethrough, said mount comprising:
    a first member having a substantially flat surface for engaging the first side of said object and further having guide means for guiding said strap about a portion of said first member so that said strap extends beyond said substantially flat surface; and
    a second member having a substantially flat surface for engaging the second side of said object and having guide means for guiding said cable tie about a portion of said second member so that said cable tie extends beyond the last-mentioned substantially flat surface, said second member further including holding means for captively holding the locking head so that said strap-receiving aperture extends generally perpendicularly to the substantially flat surface of said second member, said substantially flat surfaces being positionable facing each other and in substantial registration with each other whereby after the locking head is positioned in the holding means and the strap is positioned in the respective guide means of the first member and the second member, respectively, the object can be inserted between said flat surfaces and the strap inserted through the locking head and tightened thereby to firmly hold said object without substantial deformation thereof.

4. A mount as set forth in claim 3 wherein said first member is an elongate base and wherein its guide means extends beyond the held object and comprises a pair of spaced walls which partially define an elongate slot extending generally parallel to and spaced from the substantially flat surface of the base, and base including apertures adjacent each end of its substantially flat surface and which extend into said slot, one of said apertures permitting entrance of said strap into said slot and the other permitting egress of said strap therefrom.

5. A mount as set forth in claim 4 wherein said base includes a tongue extending longitudinally from said slot, said tongue having an aperture therethrough for receiving a mounting fastener.

6. A mount as set forth in claim 5 in which the flat surface of the base is raised relative to said tongue, and in which said slot is of sufficient depth to permit threading of said strap when said base is mounted on a support such as a panelboard.

7. A mount as set forth in claim 4 wherein each aperture is partially defined by opposed surfaces extending transversely to the longitudinal direction of said base, said opposed surfaces extending inwardly from the substantially flat surface of the base thereby to guide said strap into and out of said slot.

8. A mount as set forth in claim 3 wherein said second member is an elongate clamp cover and comprises a pair of spaced generally parallel rails for holding said strap therebetween and directing it substantially in the longitudinal direction of said cover, said rails extending from the substantially flat surface of the clamp cover with the spacing between the rails being substantially equal to but slightly greater than the width of said strap.

9. A mount as set forth in claim 8 wherein said cover further comprises a support joining said rails, the substantially flat surface of the cover comprising one surface of said support.

10. A mount as set forth in claim 9 wherein said rails have facing side surfaces and said support has a joining surface extending between said side surfaces, the last-mentioned three surfaces defining a channel and constituting the guide means of the cover 11. A mount as set forth in claim 10 wherein said rails are relieved adjacent one end of said cover to form transversely extending abutment surfaces for engaging said locking head, said holding means comprising said abutment surfaces.

12. A mount as set forth in claim 11 in which said holding means further comprises a retainer for said cable tie bridging said rails and sufficiently spaced from said joining surface to permit passage of said strap therebetween.

13. A mount as set forth in claim 12 wherein said holding means further comprises a lip extending from said joining surface at said one end of said cover, said lip being spaced from said abutment surfaces a distance slightly greater than the length of said locking head whereby as said strap is pulled down said channel away from said one end of said cover, said locking head upon clearing said lip will resiliently snap into engagement with said joining surface between said abutment surfaces and said lip.

14. A mount as set forth in claim 13 wherein said support has an aperture therethrough adjacent said lip to permit threading of said strap into said locking head.

15. A mount as set forth in claim 10 in which said joining surface is inclined from one end of the cover relative to the substantial flat surface of the cover, the portion of the joining surface adjacent the other end of said cover being curved toward the substantially flat surface of the cover to eliminate excessive stress concentration in the strap and to permit strap motion as it is tightened about said object.

16. A mount as set forth in claim 10 wherein said cover includes a transverse slot extending through said rails for receiving a cutter to allow cutting of said cable tie without damaging said object.

17. A mount as set forth in claim 3 wherein said second member is an elongate and channel shaped clamp cover comprising a pair of generally parallel arms joined by a web with the substantially flat surface of the cover constituting the base surface of said web.

18. A mount as set forth in claim 3 wherein said first member and said second member are made of insulative material.

19. A mount for use with a cable tie having a locking head and a strap extending therefrom for mounting at least one elongate object having opposed generally flat first and second sides, such as a flat cable, to a support such as a panelboard, said mount comprising:

a base for attachment to said support and having a substantially flat base surface for engaging the first side of said object and further having guide means for guiding said strap about a portion of said base so that said strap extends beyond said base surface, said guide means comprising an exit aperture permitting exit of said strap from said base after the strap has been positioned about said portion of said base; and a clamp cover having holding means for captively holding the locking head and having a substantially flat clamp surface for engaging the second side of said object and further having guide means for guiding said cable tie about a portion of said clamp cover so that said cable tie extends beyond said clamp surface, said clamp surface being positionable facing said base surface and in substantial registration therewith, said cover including an entrance aperture for receiving said strap after it has been positioned about said portion of said base, said apertures being in substantial alignment when said surfaces are in substantial registration, whereby after the locking head is positioned in the holding means and the strap is positioned in the respective guide means of the base and the clamp cover, respectively, said object can be inserted between said surfaces and the strap inserted through the locking head and tightened thereby to hold said object without substantial deformation thereof.

20. A cable mount for use with a cable tie having a locking head and a strap extending therefrom for forming a plurality of elongate relatively flat objects such as flat cables into a stacked bundle, each object having opposed first and second wide surfaces, said head including a strap-receiving aperture extending therethrough, said mount comprising:

a base for mounting on a support such as a panelboard, said base having a substantially flat base surface for engaging a first wide surface of one of said objects, said base further including guide means for releasably holding said strap about said objects and for spacing the strap from said first wide surface; and an insulative clamp cover including a substantially flat clamp surface for engaging a second wide surface of another of said objects, said clamp surface being positionable facing said base surface and in substantial registration therewith, said cover including guide means for guiding said strap about said objects and for spacing the strap from said second wide surface, said cover further including holding means captively holding said head with said strap-receiving aperture extending generally perpendicularly to said clamp surface, whereby after the locking head is positioned in the holding means and the strap is positioned in the respective guide means of the base and the clamp cover, the objects can be positioned between said base surface and said clamp surface and the strap inserted through the locking head and tightened thereby to form said objects into a bundle without substantial deformation thereof.

21. The combination of at least one flat cable having opposed generally flat first and second sides, a cable tie having a strap and a locking head extending therefrom including a strap-receiving aperture extending through said head and a mount for holding said flat cable, said mount comprising:

a first member, one of said first member and said strap having a substantially flat surface for engaging the first side of said object, said first member having guide means for guiding said strap about a portion of said first member so that said strap extends beyond said flat surface; and a second member having holding means for captively holding the locking head, one of said first member and said strap having a substantially flat surface for engaging the second side of said object, said second member further having guide means for guiding said cable tie about a portion of said second member so that said cable tie extends beyond the last mentioned substantially flat surface, said substantially flat surfaces being positionable facing each other and in substantial registration with each other, said holding means holding said head so that said strap-receiving aperture extends generally perpendicularly to said surface of said second member, whereby after the locking head is positioned in the holding means and the strap is positioned in the respective guide means of the first member and the second member, respectively, the object can be inserted between said flat surfaces and the strap inserted through the locking head and tightened thereby to firmly hold said object without substantial deformation thereof.

* * * * *